(12) United States Patent
Gupta et al.

(10) Patent No.: US 12,175,520 B2
(45) Date of Patent: Dec. 24, 2024

(54) SYSTEM, METHOD, AND NON-TRANSITORY MACHINE-READABLE INFORMATION STORAGE MEDIUM FOR RECOMMENDATIONS OF ITEMS AND CONTROLLING AN ASSOCIATED BIAS THEREOF

(71) Applicant: Tata Consultancy Services Limited, Mumbai (IN)

(72) Inventors: Priyanka Gupta, Noida (IN); Pankaj Malhotra, Noida (IN); Ankit Sharma, Noida (IN); Gautam Shroff, Noida (IN); Lovekesh Vig, Noida (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 256 days.

(21) Appl. No.: 17/813,741

(22) Filed: Jul. 20, 2022

(65) Prior Publication Data
US 2023/0169569 A1 Jun. 1, 2023

(30) Foreign Application Priority Data
Oct. 29, 2021 (IN) .............................. 202121049708

(51) Int. Cl.
*G06Q 30/00* (2023.01)
*G06Q 30/0601* (2023.01)

(52) U.S. Cl.
CPC ................................. *G06Q 30/0631* (2013.01)

(58) Field of Classification Search
CPC ........... G06Q 30/0631; G06Q 30/0282; G06N 3/042; G06N 3/045; G06N 3/09
See application file for complete search history.

(56) References Cited

U.S. PATENT DOCUMENTS

| 2022/0004898 A1* | 1/2022 | Sinha | ..................... | G06N 3/045 |
| 2022/0374962 A1* | 11/2022 | Cai | .................... | G06Q 30/0631 |

FOREIGN PATENT DOCUMENTS

CN 106855876 B 6/2021

OTHER PUBLICATIONS

Wang, Haohan, Zhenglin Wu, and Eric P. Xing. "Removing confounding factors associated weights in deep neural networks improves the prediction accuracy for healthcare applications." Pacific Symposium on Biocomputing. Pacific Symposium on Biocomputing. vol. 24. NIH Public Access, 2019. (Year: 2019).*

(Continued)

*Primary Examiner* — Jeffrey A. Smith
*Assistant Examiner* — Kennedy Gibson-Wynn
(74) *Attorney, Agent, or Firm* — FINNEGAN, HENDERSON, FARABOW, GARRETT & DUNNER LLP

(57) ABSTRACT

Recommender Systems (RS) tend to recommend more popular items instead of the relevant long-tail items. Mitigating such popularity bias is crucial to ensure that less popular but relevant items are recommended. System described herein analyses popularity bias in session-based RS obtained via deep learning (DL) models. DL models trained on historical user-item interactions in session logs (having long-tailed item-click distributions) tend to amplify popularity bias. To understand source of this bias amplification, potential sources of bias at data-generation stage (user-item interactions captured as session logs) and model training stage are considered by the system for recommendation wherein popularity of item has causal effect on user-item interactions via conformity bias, and item ranking from models via biased training process due to class imbalance. While most existing approaches address only one of these effects, a comprehensive causal inference framework is implemented by present disclosure that identifies and mitigates effects at both stages.

12 Claims, 10 Drawing Sheets

(56) References Cited

OTHER PUBLICATIONS

Wang, Yixin, et al. "Causal inference for recommender systems." Proceedings of the 14th ACM Conference on Recommender Systems. 2020. (Year: 2020).*
Zhu, Ziwei, Jianling Wang, and James Caverlee. "Measuring and mitigating item under-recommendation bias in personalized ranking systems." Proceedings of the 43rd international ACM SIGIR conference on research and development in information retrieval. 2020. (Year: 2020).*
Lin, Chen, et al. "Mitigating sentiment bias for recommender systems." Proceedings of the 44th International ACM SIGIR Conference on Research and Development in Information Retrieval. 2021. (Year: 2021).*
Wang, Wenjie, et al. "Deconfounded recommendation for alleviating bias amplification." Proceedings of the 27th ACM SIGKDD conference on knowledge discovery & data mining. 2021. (Year: 2021).*
Ziwei Zhu et al., "Popularity Bias in Dynamic Recommendation," Proceedings of the 27th ACM SIGKDD Conference on Knowledge Discovery & Data Mining, Aug. 2021, ACM, https://people.engr.tamu.edu/caverlee/pubs/Ziwei_KDD_2021.pdf.
Rodrigo Borges et al., "On mitigating popularity bias in recommendations via variational encoders," Proceedings of the 36th Annual ACM Symposium on Applied Computing, Mar. 2021, pp. 1383-1389, ACM, https://homepages.tuni.fi/konstantinos.stefanidis/docs/sac2021.pdf.
Ajay Gangwar et al., "An Adaptive Boosting Technique to Mitigate Popularity Bias in Recommender System," Machine Learning, Sep. 2021, Arxiv, https://arxiv.org/pdf/2109.05677.pdf.

* cited by examiner

SYSTEM, METHOD, AND NON-TRANSITORY MACHINE-READABLE INFORMATION STORAGE MEDIUM FOR RECOMMENDATIONS OF ITEMS AND CONTROLLING AN ASSOCIATED BIAS THEREOF

PRIORITY CLAIM

This U.S. patent application claims priority under 35 U.S.C. § 119 to: Indian Patent Application No. 202121049708, filed on Oct. 29, 2021. The entire contents of the aforementioned application are incorporated herein by reference.

TECHNICAL FIELD

The disclosure herein generally relates to recommendation system, and, more particularly, to systems and methods for recommendation of items and controlling an associated bias thereof.

BACKGROUND

Recommender Systems (RS) tend to recommend more popular items instead of the relevant long-tail items. Mitigating such popularity bias is crucial to ensure that less popular but relevant items are part of the recommendation list shown to the user. Existing methods for handling popularity bias in recommendation system consider bias induced due to data-generation process (i.e., user-system interactions) i.e., the data distribution. They do not consider effect of biases arising during training of the deep learning models. Also, some existing methods rely on the re-ranking recommendation list as the post-processing step and ignore skewed class distribution during the training stage itself. While some other methods rely on the prior information of the less popular items/more popular items/balanced data etc., that is not available always. All the above methods are prone to error in terms of providing recommendations to users.

SUMMARY

Embodiments of the present disclosure present technological improvements as solutions to one or more of the above-mentioned technical problems recognized by the inventors in conventional systems. For example, in one aspect, there is provided a processor implemented method for recommendation of items and controlling an associated bias thereof. The method comprises receiving, via one or more hardware processors, a training session browsing history of a user from a user device, wherein the session browsing history comprises information on one or more items, and a session comprising a sequence of clicks on the one or more items; performing, via the one or more hardware processors, deconfounding training of a neural network (NN) model using (i) a plurality of causal graphs obtained based on domain knowledge, (ii) the training session browsing history, and (iii) a catalogue of items to obtain a trained NN model; applying, via the one or more hardware processors, the trained NN model to a test session browsing history comprising information corresponding to a sequence of items, to obtain a causal inference derived from a test output associated therein; identifying, via the one or more hardware processors, a total effect associated with one or more items on the test session browsing history based on the causal inference; removing, via the one or more hardware processors, an indirect effect from the total effect; upon removing the indirect effect, obtaining, via the one or more hardware processors, a logit for each item comprised in the catalogue of items; applying, via the one or more hardware processors, a softmax function on the logit obtained for each item from the item catalogue to obtain a relevance score for each item from the catalogue of items; and recommending, via the one or more hardware processors, at least a subset of items from the catalogue of items based on the relevance score.

In an embodiment, a first causal graph of the plurality of causal graphs comprises at least one of (i) one or more nodes representing interest of the user during the session, (ii) one or more features of the one or more items along with an associated popularity, (iii) a relevance score of the one or more items during the session based on the interest of the user, and (iv) an outcome associated with a corresponding item.

In an embodiment, a second causal graph of the plurality of causal graphs comprises at least one of (i) one or more embeddings corresponding to the one or more items, (ii) embedding of a session, (iii) a momentum of an optimizer, (iv) average embedding of two or more sessions comprised in the session browsing history biased towards embeddings of popular items, and (v) a probability of clicking an item.

In an embodiment, the neural network model is deconfounding trained to (i) reduce an effect of the momentum of the optimizer comprised in the second causal graph, and (ii) control an amount of bias due to the one or more features of the one or more items on the outcome associated thereof.

In an embodiment, the step of performing deconfounding training of a neural network (NN) model comprises creating an embedding look up matrix for the one or more items in the catalogue of items; normalizing the embedding look up matrix to obtain one or more normalized item embeddings; modelling one or more session embeddings based on the sequence of clicks on the one or more items to obtain one or more modelled session embeddings; dividing the one or more normalized item embeddings and the one or more modelled session embeddings into one or more corresponding groups; normalizing each group from the one or more corresponding groups to obtain one or more normalized item embeddings groups and one or more normalized session embeddings groups; performing a comparison of (i) each normalized item embeddings group, and (ii) each normalized session embedding group to determine a similarity therein; obtaining a logit for each item from the one or more items based on the determined similarity; applying a softmax function on the logit obtained for each item from the one or more items to obtain a relevance score for each item from the one or more items; computing one or more cross entropy losses corresponding to one or more values of one or more weights of the neural network model based on the obtained relevance score for each item from the one or more items; and training, via an optimizer, the neural network model using the one or more cross entropy losses and updating the one or more weights of the trained neural network model.

In another aspect, there is provided a processor implemented system for recommendation of items and controlling an associated bias thereof. The system comprises a memory storing instructions; one or more communication interfaces; and one or more hardware processors coupled to the memory via the one or more communication interfaces, wherein the one or more hardware processors are configured by the instructions to: receive a training session browsing history of a user from a user device, wherein the session browsing history comprises information on one or more items, and a session comprising a sequence of clicks on the one or more items; perform deconfounding training of a neural network (NN) model using (i) a plurality of causal graphs obtained based on domain knowledge, (ii) the training session browsing history, and (iii) a catalogue of items to obtain a trained NN model; apply the trained NN model to a test session browsing history comprising information corresponding to a sequence of items, to obtain a causal inference derived from a test output associated therein; identify a total effect associated with one or more items on the test session browsing history based on the causal inference; remove an indirect effect from the total effect; upon removing the indirect effect, obtain a logit for each item comprised in the catalogue of items; apply a softmax function on the logit obtained for each item from the item catalogue to obtain a relevance score for each item from the catalogue of items; and recommend at least a subset of items from the catalogue of items based on the relevance score.

In an embodiment, a first causal graph of the plurality of causal graphs comprises at least one of (i) one or more nodes representing interest of the user during the session, (ii) one or more features of the one or more items along with an associated popularity, (iii) a relevance score of the one or more items during the session based on the interest of the user, and (iv) an outcome associated with a corresponding item.

In an embodiment, a second causal graph of the plurality of causal graphs comprises at least one of (i) one or more embeddings corresponding to the one or more items, (ii) embedding of a session, (iii) a momentum of an optimizer, (iv) average embedding of two or more sessions comprised in the session browsing history biased towards embeddings of popular items, and (v) a probability of clicking an item.

In an embodiment, the neural network model is deconfounding trained to (i) reduce an effect of the momentum of the optimizer comprised in the second causal graph, and (ii) control an amount of bias due to the one or more features of the one or more items on the outcome associated thereof.

In an embodiment, the trained neural network (NN) model is obtained by: creating an embedding look up matrix for the one or more items in the catalogue of items; normalizing the embedding look up matrix to obtain one or more normalized item embeddings; modelling one or more session embeddings based on the sequence of clicks on the one or more items to obtain one or more modelled session embeddings; dividing the one or more normalized item embeddings and the one or more modelled session embeddings into one or more corresponding groups; normalizing each group from the one or more corresponding groups to obtain one or more normalized item embeddings groups and one or more normalized session embeddings groups; performing a comparison of (i) each normalized item embeddings group, and (ii) each normalized session embedding group to determine a similarity therein; obtaining a logit for each item from the one or more items based on the determined similarity; applying a softmax function on the logit obtained for each item from the one or more items to obtain a relevance score for each item from the one or more items; computing one or more cross entropy losses corresponding to one or more values of one or more weights of the neural network model based on the obtained relevance score for each item from the one or more items; and training, via an optimizer, the neural network model using the one or more cross entropy losses and updating the one or more weights of the trained neural network model.

In yet another aspect, there are provided one or more non-transitory machine-readable information storage mediums comprising one or more instructions which when executed by one or more hardware processors cause a method for recommendation of items and controlling an associated bias thereof. The method comprises receiving, via the one or more hardware processors, a training session browsing history of a user from a user device, wherein the session browsing history comprises information on one or more items, and a session comprising a sequence of clicks on the one or more items; performing, via the one or more hardware processors, deconfounding training of a neural network (NN) model using (i) a plurality of causal graphs obtained based on domain knowledge, (ii) the training session browsing history, and (iii) a catalogue of items to obtain a trained NN model; applying, via the one or more hardware processors, the trained NN model to a test session browsing history comprising information corresponding to a sequence of items, to obtain a causal inference derived from a test output associated therein; identifying, via the one or more hardware processors, a total effect associated with one or more items on the test session browsing history based on the causal inference; removing, via the one or more hardware processors, an indirect effect from the total effect; upon removing the indirect effect, obtaining, via the one or more hardware processors, a logit for each item comprised in the catalogue of items; applying, via the one or more hardware processors, a softmax function on the logit obtained for each item from the item catalogue to obtain a relevance score for each item from the catalogue of items; and recommending, via the one or more hardware processors, at least a subset of items from the catalogue of items based on the relevance score.

In an embodiment, a first causal graph of the plurality of causal graphs comprises at least one of (i) one or more nodes representing interest of the user during the session, (ii) one or more features of the one or more items along with an associated popularity, (iii) a relevance score of the one or more items during the session based on the interest of the user, and (iv) an outcome associated with a corresponding item.

In an embodiment, a second causal graph of the plurality of causal graphs comprises at least one of (i) one or more embeddings corresponding to the one or more items, (ii) embedding of a session, (iii) a momentum of an optimizer, (iv) average embedding of two or more sessions comprised in the session browsing history biased towards embeddings of popular items, and (v) a probability of clicking an item.

In an embodiment, the neural network model is deconfounding trained to (i) reduce an effect of the momentum of the optimizer comprised in the second causal graph, and (ii) control an amount of bias due to the one or more features of the one or more items on the outcome associated thereof.

In an embodiment, the step of performing deconfounding training of a neural network (NN) model comprises creating an embedding look up matrix for the one or more items in the catalogue of items; normalizing the embedding look up matrix to obtain one or more normalized item embeddings; modelling one or more session embeddings based on the sequence of clicks on the one or more items to obtain one or more modelled session embeddings; dividing the one or more normalized item embeddings and the one or more modelled session embeddings into one or more corresponding groups; normalizing each group from the one or more corresponding groups to obtain one or more normalized item embeddings groups and one or more normalized session embeddings groups; performing a comparison of (i) each normalized item embeddings group, and (ii) each normalized session embedding group to determine a similarity therein; obtaining a logit for each item from the one or more items based on the determined similarity; applying a softmax function on the logit obtained for each item from the one or more items to obtain a relevance score for each item from the one or more items; computing one or more cross entropy losses corresponding to one or more values of one or more weights of the neural network model based on the obtained relevance score for each item from the one or more items; and training, via an optimizer, the neural network model using the one or more cross entropy losses and updating the one or more weights of the trained neural network model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
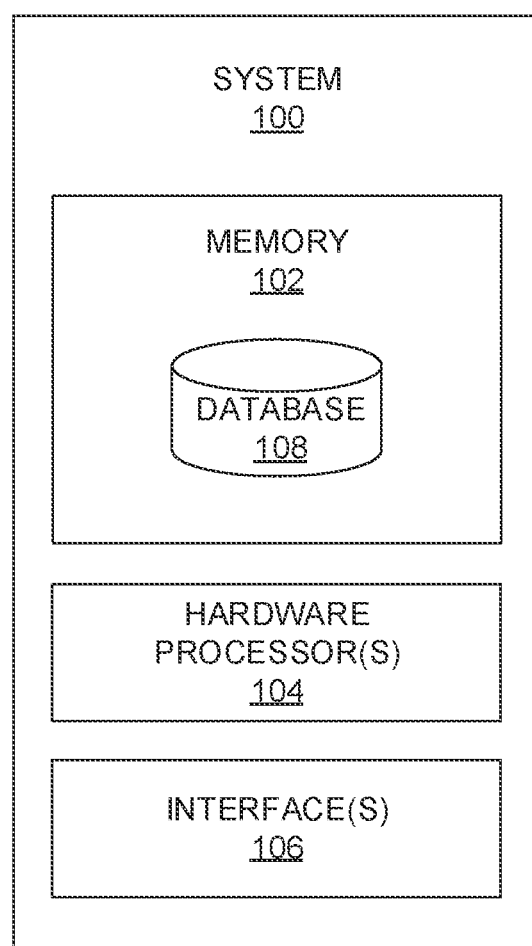
FIG. 1 illustrates an exemplary title system according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The goal of Session based Recommending System (SRS) is to recommend a list of most relevant items to a user based on the sequence of previously clicked items in the session. Recently, several effective deep neural networks (DNNs) based models have been proposed for SRS. In these methods, the training objective is typically cast as a multi-class classification problem, where the input is the sequence of items clicked in the past in a session, and the target class corresponds to the next item clicked by the user. Various backbone architectures such as recurrent neural networks, graph neural networks (GNNs), attention networks, and their combinations have been successfully used for developing SRS.

It is well-known that more popular items are presented and interacted-with more often on online platforms. This results in a skewed distribution of items clicked by users. The models trained using the resulting data tend to amplify this popularity bias. The system and method note and empirically show that conventional network models such as Session-based Recommendation with Graph Neural Networks (SR-GNN) suffers from the popularity bias. Though popularity bias has been studied extensively in non-sequential collaborative filtering (CF) setups where past interactions (clicks or buys) of a user beyond the current session are known, the literature on handling popularity bias in SRS is scarce. Recently, popularity bias has been studied from a causal perspective in the CF setting, resulting in state-of-the-art performance. However, most of these approaches focus on the biases introduced due to the popularity of an item in the outcome of interactions between user and item, i.e., at the data-generation stage, e.g., due to conformity bias. The expression "conformity bias" as described in the present disclosure refers to a user being influenced by another user for an item. For instance, a user 1 may have clicked on a particular item (item 1), this clicking or selection of the item 1 may be influenced by other users (e.g., user 2). In other words, user 2 may be influenced by user 1's interaction with one or more items. Such influence may be referred as conformity bias. Most of these approaches do not address the biases introduced while learning the parameters of the neural network with long-tailed item distributions. A causal perspective to such an issue has been recently considered for computer vision applications (e.g., refer "Kaihua Tang, Jianqiang Huang, and Hanwang Zhang. 2020. Long-Tailed Classification by Keeping the Good and Removing the Bad Momentum Causal Effect. In Advances in Neural Information Processing Systems, H. Larochelle, M. Ranzato, R. Hadsell, M. F. Balcan, and H. Lin (Eds.), Vol. 33. 1513-1524.").

Some of the conventional methods such as re-ranking based methods re-rank the recommendation list by suitably increasing the relevance scores for less popular items while decreasing it for more popular items. However, these approaches often-overlooked effect of skewed class distribution during the training stage itself, rather than trying to mitigate it during post-processing.

Another approach includes Long-tail classification: Normalized classifiers e.g., based on cosine or capsules squashing which apply normalization on the weights of the final layer and the final representation of the input. Another research work (Decouple-LWS (DLWS)) decouples the backbone architecture and the classifier and proposes a 2-step learning process: a) learning backbone model with biased data, and then b) learning the classifier with unbiased/balanced data. Present disclosure and its system and method considers a single step learning procedure inspired by a causal diagram and can work for the scenarios' where balanced data is not available.

Another research work (Focal loss) handled the class imbalance by down-weighting the loss assigned to well-classified instances. However, it cannot naturally handle or leverage conformity bias. Yet another research work (Deconfound-TDE (DTDE)—refer "Kaihua Tang, Jianqiang Huang, and Hanwang Zhang. 2020. Long-Tailed Classification by Keeping the Good and Removing the Bad Momentum Causal Effect. In Advances in Neural Information Processing Systems, H. Larochelle, M. Ranzato, R. Hadsell, M. F. Balcan, and H. Lin (Eds.), Vol. 33. 1513-1524.—also referred as Tang et al.") proposed a causal graph that suggests momentum of stochastic gradient descent (SGD) optimizer has an effect on the features learned and the final outcome (logits of any trainable model) and explains using a causal perspective why the outcomes tend to be biased towards head classes both during training and inference. However, it is empirically shown by the present disclosure and its system and method that this alone is not sufficient for SRS as it ignores the related problem of conformity bias arising during the data-generation stage prior to model training.

Another research work included causal approaches to handle popularity Bias (Model-Agnostic Counterfactual Reasoning—MACR): mitigates popularity bias from a cause-effect perspective. It models user-item relevance, item popularity and users' prior as a causal graph and executes test-time counterfactual inference query to eliminate the impact of popularity bias. Another research work (PDA) proposed causal graph for recommendation process and shows that the negative effect of item popularity is due to its confounding nature. However, most of these approaches are proposed for collaborative filtering (CF), and not evaluated in SRS setting. Furthermore, none of these approaches consider the amplification of biases during training.

Normalized Item and Session Representations with Graph Neural Networks (NISER) motivated the advantage of restricting the item and session-graph representations to lie on a unit hypersphere both during training and inference to handle popularity bias in SRS. System and method of the present disclosure can be seen as a generalization of NISER motivated by a causal framework. In fact, NISER can be seen as a special case of the system and method of the present disclosure when $\alpha=\beta=0$ (refer description below). TailNet (Long-tail session-based recommendation) is a session-based deep neural network (DNN) architecture which shows improvement in long-tail recommendation performance with prior knowledge of long-tail and head items during training, which is not needed for the method and system of the present disclosure.

In the present disclosure, system and method consider a more holistic causal view of item popularity related biases in SRS setting by capturing it at data generation as well as training stages. More specifically, the system of the present disclosure looks at popularity bias in SRS from causal perspective and incorporate insights from it to develop an approach to mitigate popularity bias. To this end, Causal Session-based Recommendations (CauSeR), a framework (comprised in the memory 102) is implemented by the system and method of the present disclosure that performs deconfounded training and causal inference to remove the biases introduced during training and also models conformity bias, simultaneously. The system and method of the present disclosure further demonstrate that CauSeR improves upon several strong baselines from literature for popularity bias and long-tailed classification by evaluating in a simulated environment setup (i.e., pre-defined rules for user-behavior) and on a real-world dataset.

Referring now to the drawings, and more particularly to FIGS. 1 through 4G, where similar reference characters denote corresponding features consistently throughout the figures, there are shown preferred embodiments and these embodiments are described in the context of the following exemplary system and/or method.

FIG. 1 depicts an exemplary system for recommendation of items and controlling an associated bias thereof, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information training session browsing history, test session browsing history, a plurality of causal graphs obtained based on domain knowledge, a catalogue of items, etc total effect associated with one or more items on the test session browsing history based on the causal inference, indirect effect comprised in the total effect, logit obtained for each item comprised in the catalogue of items, relevance score for each item, recommended item details, embedding look up matrix for items from catalogue, one or more normalized item embeddings, modelled session embeddings, one or more normalized item embeddings groups, one or more normalized session embeddings groups, information related to similarity between each group, one or more cross entropy losses corresponding to one or more values of one or more weights of the neural network model based on the obtained relevance score, trained NN model, updated weights, and the like. The database 108 may further comprise one or more other techniques(s) (not shown in the FIGS). The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
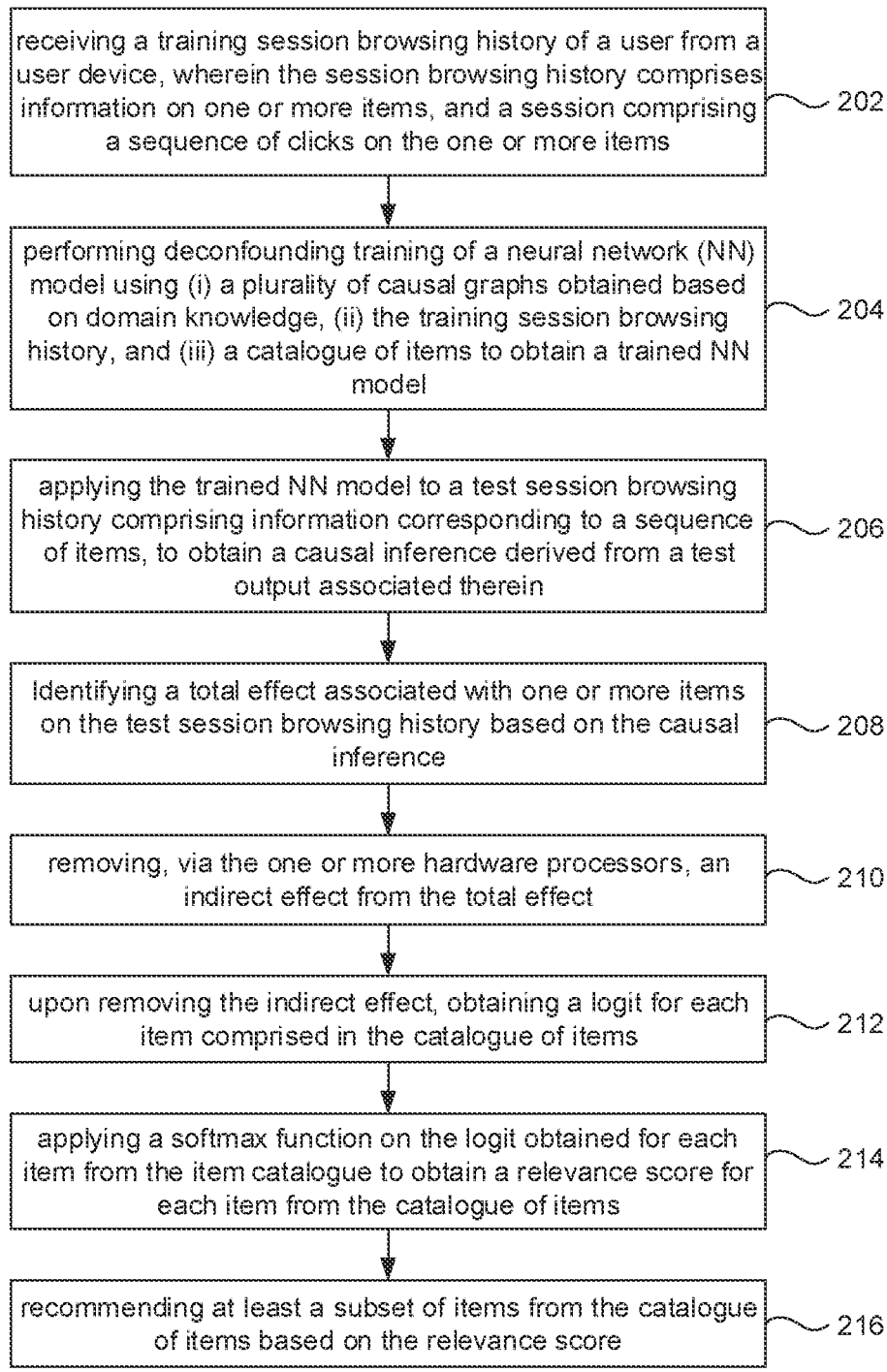
FIG. 2 is a functional block diagram according to some embodiments of the present disclosure.

FIG. 3 depicts an exemplary flow chart illustrating a method for recommendation of items and controlling an associated bias thereof, in accordance with an embodiment of the present disclosure, using the systems of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2. At step 202 of the present disclosure, the one or more hardware processors 104 receive a training browsing session history of a user from a user device. The training session browsing history comprises information on one or more items, and a session comprising a sequence of clicks on the one or more items. At step 204 of the present disclosure, the one or more hardware processors 104 perform deconfounding training of a neural network (NN) model using (i) a plurality of causal graphs obtained based on domain knowledge (ii) the training session browsing history, and (iii) a catalogue of items (e.g., products in Retail, articles in News, hotels in Hospitality, etc) to obtain a trained NN model.

Figure 3A:
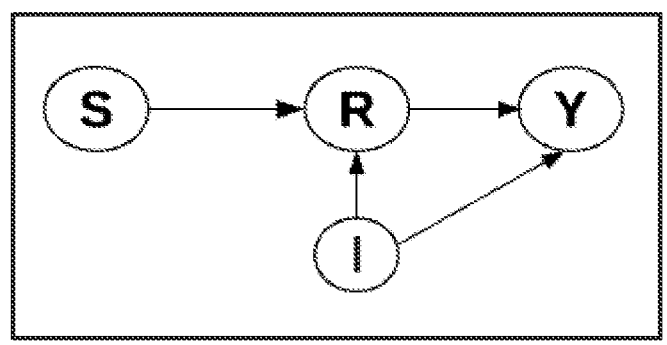
FIG. 3A depicts a causal graph considered for data-generation stage by the system of FIG. 1, in accordance with an embodiment of the present disclosure.

In an embodiment, a first causal graph of the plurality of causal graphs comprises at least one of (i) one or more nodes representing interest of the user during the session, (ii) one or more features of the one or more items along with an associated popularity, (iii) a relevance score of the one or more items during the session based on the interest of the user, and (iv) an outcome associated with a corresponding item (e.g., refer FIG. 3A).

In another embodiment, a second causal graph of the plurality of causal graphs comprises at least one of (i) one or more embeddings corresponding to the one or more items; (ii) embedding of a session, (iii) a momentum of an optimizer comprised in the second causal graph, (iv) average embedding of two or more sessions comprised in the session browsing history biased towards embeddings of popular items, and (v) a probability of clicking an item.

In an embodiment, the step of performing deconfounding training of a neural network (NN) model comprises creating an embedding look up matrix for the one or more items in the catalogue of items; normalizing the embedding look up matrix to obtain one or more normalized item embeddings; modelling one or more session embeddings based on the sequence of clicks on the one or more items to obtain one or more modelled session embeddings; dividing the one or more normalized item embeddings and the one or more modelled session embeddings into one or more corresponding groups (e.g., refer equation (2) below for dividing); normalizing each group from the one or more corresponding groups to obtain one or more normalized item embeddings groups and one or more normalized session embeddings groups (e.g., refer equation (2) below for normalizing); performing a comparison of (i) each normalized item embeddings group, and (ii) each normalized session embedding group to determine a similarity therein (e.g., refer equation (2) below for comparison); obtaining a logit for each item from the one or more items based on the determined similarity (e.g., refer equation (2) below for logit estimation/computation); applying a softmax function on the logit obtained for each item from the one or more items to obtain a relevance score for each item from the one or more items; computing one or more cross entropy losses corresponding to one or more values of one or more weights of the neural network model based on the obtained relevance score for each item from the one or more items; and training, via an optimizer, the neural network model using the one or more cross entropy losses and updating the one or more weights of the trained neural network model.

In an embodiment, the neural network model is deconfounding trained to (i) reduce an effect of the momentum of the optimizer comprised in the second causal graph, (ii) control an amount of bias due to the one or more features (features could be popularity bias or conformity bias) of the one or more items on the outcome associated thereof. The above steps 202 and 204 are better understood by way of following description.

Let S denote the set of all past sessions containing user-item interactions (e.g., click data), and I denote the set of n items observed in the set S. Any session $s \in S$ is a sequence of item-click events: $s=(i_{s,1}, i_{s,2}, \ldots, i_{2,l})$, where each of the l item-click events $i_{s,j}=(j=1, \ldots, l)$ corresponds to an item in I, and j denotes the position of the item $i_{s,j}$ in the session s. The goal of system 100 is to predict the next item $i_{s,l+1}$ as the target class in an n-way classification problem by estimating the n-dimensional item-probability vector $\hat{y}_{s,l+1}$ corresponding to the relevance scores for the n items. The k items with highest scores constitute the top-k recommendations.

Figure 3B:
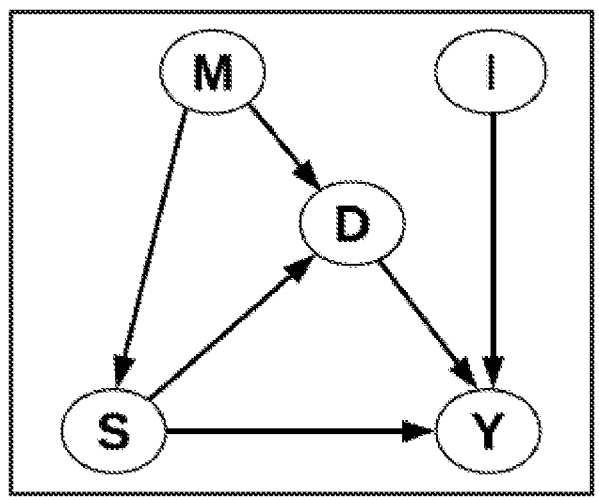
FIG. 3B depicts a causal graph considered for training stage by the system of FIG. 1, in accordance with an embodiment of the present disclosure.

The system 100 looks at the phenomenon of popularity bias at data-generation as well as DL model training stages, resulting in the causal graphs with six important variables as introduced in the caption of FIG. 3A. Intuitively, the momentum M of SGD optimizer is biased towards the head items (popular target classes) resulting in biased parameters of the SR-GNN model (refer "Kaihua Tang, Jianqiang Huang, and Hanwang Zhang. 2020. Long-Tailed Classification by Keeping the Good and Removing the Bad Momentum Causal Effect. In Advances in Neural Information Processing Systems, H. Larochelle, M. Ranzato, R. Hadsell, M. F. Balcan, and H. Lin (Eds.), Vol. 33. 1513-1524."— herein referred as Kaihua et al. —for details and proof which is omitted herein for sake of brevity). This results in an effect on the i) session embeddings via M→S, ii) outcome Y through a mediator D, via, M→D→Y, where D is the projection of S on to the head direction, as depicted in FIG. 3B. As a result, M is a common cause to both S and Y, and thus acts as a confounder. Thus, while the total effect of session S on the outcome Y has only one path through relevance R of an item I, i.e., S→R→Y in the data-generation stage as depicted in FIG. 3A, there is an additional indirect effect (IDE) S→D→Y apart from direct effect (DE) S→Y during the training stage, as depicted in FIG. 3B. Similarly, item embedding I has an effect on session-item relevance estimate R via I→R. It also has a direct effect on final output Y via I→Y due to popularity of an item, e.g., head item is likely to get clicked more often irrespective of relevance R, i.e., conformity bias (e.g., refer "Yang Zhang, Fuli Feng, Xiangnan He, Tianxin Wei, Chonggang Song, Guohui Ling, and Yongdong Zhang. 2021. Causal Intervention for Leveraging Popularity Bias in Recommendation. arXiv preprint arXiv:2105.06067 (2021)." also referred as Zhang et al.). Given the above scenario, the goal of debiasing can be cast as: estimate the direct effect of session (S) on outcome Y (i.e., S→Y) and model the direct effect of I on Y, i.e., I→Y, simultaneously.

Training Procedure:

Causal effect of S and I on Y is defined as P (Y|do(S),I) while mitigating the effect of the confounder M as do(S) removes the effect of M→S, and direct effect of I on Y as P(Y|I). Predictive model is formulated as P(Y|do(S),I)*(P(Y|I))$^\beta$, where $\beta$ controls the amount of conformity bias, i.e., direct effect of I on Y. In other words, the neural network model is deconfounding trained to (i) reduce an effect of the momentum of the optimizer comprised in the second causal graph, (ii) control an amount of bias due to the one or more features (wherein the features could be popularity or conformity) of the one or more items on the outcome associated thereof.

P(Y|do(S),I) is estimated as follows:

$$P(Y \mid do(S=s), I=i_j) = \sum_m P(Y \mid s, i_j, D(m,s))P(M=m) \approx \frac{1}{K}\sum_{k=1}^{K} P(Y \mid s^{(k)}, i_j^{(k)}, d^{(k)}) \quad (1)$$

where s is session embedding, $i_j$ is $j^{th}$ item's embedding, and d is projection of session embedding s in head direction, i.e., $$d = \hat{d}\cos(s, \hat{d})\|s\|,$$

$$\text{where } \hat{d} = \frac{\bar{s}_T}{\|\bar{s}_T\|},$$

$\bar{s}_t = \mu \cdot \bar{s}_{t-1} + s_t$ is the weighted moving-average session embedding vector with decay rate $\mu$, $s_t$ is average session embedding at training iteration 't', and T is the total training iterations. A multi-head strategy (e.g., refer "Kaihua Tang, Jianqiang Huang, and Hanwang Zhang. 2020. Long-Tailed Classification by Keeping the Good and Removing the Bad Momentum Causal Effect. In Advances in Neural Information Processing Systems, H. Larochelle, M. Ranzato, R. Hadsell, M. F. Balcan, and H. Lin (Eds.), Vol. 33. 1513-1524."—referred as Tang et al. and "Ashish Vaswani, Noam Shazeer, Niki Parmar, Jakob Uszkoreit, Llion Jones, Aidan N Gomez, Lukasz Kaiser, and Illia Polosukhin. 2017. Attention is all you need. In Advances in neural information processing systems. 5998-6008."—referred as Vaswani et al.) to equally divide dimensions of items and session embedding into K groups, which can be considered as K values sampled for M. Finally, logits corresponding to P(Y|do(S),I) are estimated as:

$$[Y \mid do(s), I] = \frac{\tau}{K}\sum_{k=1}^{K} \frac{\left(i_j^{(k)}\right)^T s^{(k)}}{\|i_j^{(k)}\|_2 \|s^{(k)}\|_2}, \quad (2)$$

where $\tau$ is a scaling factor, i.e. $\tau > 1$, $i_j \in \mathbb{R}^d$, $s = f(I_s; \theta) \in \mathbb{R}^d$, f is any SRS backbone architecture (SR-GNN in the present disclosure) parameterized by $\theta$, and $I_s = [i_{s,1}, i_{s,2}, \ldots, i_{s,l}]^T \in \mathbb{R}^{l \times d}$ are the embeddings of the items present in the session s till timestep l.

Further, the logit for P(Y|I) as $$[Y \mid I = i_j] = \frac{(i_j)^T w}{\|i_j\|_2},$$

$w \in \mathbb{R}^d$ are estimated. The estimated probabilities be $\hat{y}_{s,j} = \text{softmax}([Y|do(S=s), I=i_j])$, and $\hat{y}_j = \text{softmax}([Y|I=i_j])$ (softmax over the n-dimensional outputs corresponding to the n items). The training objective for session s is given by $\mathcal{L}(s) = \mathcal{L}_R + \beta \mathcal{L}_i$ with estimate for P(Y|do(S),I)*(P(Y|I))$^\beta$ given by $\hat{y}_{s,j} * \hat{y}_j^\beta$, and $\mathcal{L}_R = -\sum_{j=1}^n y_j \log(\hat{y}_{s,j})$ and $\mathcal{L}_i = -\sum_{j=1}^n y_j \log(\hat{y}_j)$.

At step 206 of the present disclosure, the one or more hardware processors 104 apply the trained NN model to a test session browsing history comprising information corresponding to a sequence of items, to obtain a causal inference derived from a test output associated therein. At step 208 of the present disclosure, the one or more hardware processors 104 identify a total effect associated with one or more items on the test session browsing history based on the causal inference. At step 210 of the present disclosure, the one or more hardware processors 104 remove an indirect effect from the total effect. At step 212 of the present disclosure, upon removing the indirect effect, the one or more hardware processors 104 obtain a logit for each item comprised in the catalogue of items. At step 214 of the present disclosure, the one or more hardware processors 104 apply a softmax function on the logit obtained for each item from the item catalogue to obtain a relevance score for each item from the catalogue of items. At step 216 of the present disclosure, the one or more hardware processors 104 recommend at least a subset of items from the catalogue of items based on the relevance score.

The above steps of 208 till 216 are better understood by way of following description:

Once a model is trained for intervened causal graph (i.e., M↛S) and the direct effect I→Y, during inference, indirect effect of S on Y needs to be removed via S→D→Y. To mitigate the harmful indirect effect of the mediator D via S→D→Y, the system 100 considers the direct effect, i.e., DE(S→Y) as a difference of total effect given by [Y|do(S),I] and a counterfactual term as:

$$DE(S \to Y) = \frac{\tau}{K}\sum_{k=1}^{K} \left( \frac{\left(i_j^{(k)}\right)^T s^{(k)}}{\|i_j^{(k)}\|_2 \|s^{(k)}\|_2} - \alpha \frac{\cos\left(s^{(k)}, \hat{d}^{(k)}\right) \cdot \left(i_j^{(k)}\right)^T \hat{d}^{(k)}}{\|i_j^{(k)}\|_2} \right) \quad (3)$$

where $\alpha$ is the hyper-parameter to control the trade-off between direct and indirect effect of S on Y. For brevity, the present disclosure refers to Tang et al. for derivation of this direct effect. During inference, $\hat{y}_{s,j} = \text{softmax}(DE(S \to Y))$.

Experimental Evaluation:

The system and method of the present disclosure consider a simulation environment for online evaluation and a real-world dataset Diginetica (DN) for offline evaluation. In particular, the system and method consider several state-of-the-art methods from literature as baselines. These methods belong to four main class of techniques: a) reranking heuristic approaches for mitigating popularity bias (e.g., refer xQuAD—"Himan Abdollahpouri, Robin Burke, and Bamshad Mobasher. 2019. Managing popularity bias in recommender systems with personalized re-ranking. The $32^{nd}$ International FLAIRS Conference in Cooperation with AAAI (2019)."—also known as Abdollahpouri et al. and PC—"Ziwei Zhu, Yun He, Xing Zhao, Yin Zhang, Jianling Wang, and James Caverlee. 2021. Popularity-Opportunity Bias in Collaborative Filtering. In Proceedings of the 14th ACM International Conference on Web Search and Data Mining. 85-93."—also known as Zhu et al.), b) recent long-tailed classification methods (e.g., refer "Decoupled-LWS (DLWS)—Bingyi Kang, Saining Xie, Marcus Rohrbach, Zhicheng Yan, Albert Gordo, Jiashi Feng, and Yannis Kalantidis. 2019. Decoupling representation and classifier for long-tailed recognition. arXiv preprint arXiv: 1910.09217 (2019)."—also known as Kang et al., "Capsule—Ziwei Liu, Zhongqi Miao, Xiaohang Zhan, Jiayun Wang, Boqing Gong, and Stella X Yu. 2019. Large-scale long-tailed recognition in an open world. In Proceedings of the IEEE/CVF Conference on Computer Vision and Pattern Recognition. 2537-2546."—also known as Liu et al., "Focal loss—T-YLPG Ross and GKHP Dollár. 2017. Focal loss for dense object detection. In Proceedings of the IEEE Conference on Computer Vision and Pattern Recognition. 2980-2988."—also known as Ross et al., and "De-confound-TDE (DTDE)—Tang et al.") recently introduced causal approaches to popularity bias i.e., PDA (e.g., refer "Zheng et al.") and MACR (e.g., refer "Tianxin Wei, Fuli Feng, Jiawei Chen, Chufeng Shi, Ziwei Wu, Jinfeng Yi, and Xiangnan He. 2020. Model-Agnostic Counterfactual Reasoning for Eliminating Popularity Bias in Recommender System. arXiv preprint arXiv:2010.15363 (2020)."—also known as Wei et al.), and d) approaches to popularity bias in SRS, i.e., NISER (e.g., refer "Priyanka Gupta, Diksha Garg, Pankaj Malhotra, Lovekesh Vig, and Gautam Shroff. 2019. NISER: Normalized Item and Session Representations with Graph Neural Networks. arXiv preprint arXiv:1909.04276 (2019)."—also known as Gupta et al.) and TailNet (e.g., refer "Siyi Liu and Yujia Zheng. 2020. Long-tail session-based recommendation. In Fourteenth ACM conference on recommender systems. 509-514."). All these methods are used over the vanilla SR-GNN approach (e.g., refer "ShuWu, Yuyuan Tang, Yanqiao Zhu, LiangWang, Xing Xie, and Tieniu Tan. 2019. Session-based Recommendation with Graph Neural Networks. In Proceedings of the Thirty-Third AAAI Conference on Artificial Intelligence."—also known as Lu et al.).

RecSim: The system and method of the present disclosure conducted online evaluation in a simulated environment using an open-source user-behavior simulation model RecSim1 (e.g., refer "Eugene Ie, Chih-wei Hsu, Martin Mladenov, Vihan Jain, Sanmit Narvekar, Jing Wang, Rui Wu, and Craig Boutilier. 2019. RecSim: A Configurable Simulation Platform for Recommender Systems. arXiv preprint arXiv: 1909.04847 (2019)."—also known as Ie et al.), which has been recently considered for evaluating RS approaches (e.g., refer "Diksha Garg, Priyanka Gupta, Pankaj Malhotra, Lovekesh Vig, and Gautam Shroff. 2020. Batch-Constrained Distributional Reinforcement Learning for Session-based Recommendation. NeurIPS Workshop on Offline Reinforcement Learning, arXiv preprint arXiv:2012.08984 (2020)."—also known as Garg et al. and "Yanan Wang, Yong Ge, Li Li, Rui Chen, and Tong Xu. 2020. Offline Metalevel Model-based Reinforcement Learning Approach for Cold-Start Recommendation. NeurIPS Workshop on Offline Reinforcement Learning, arXiv preprint arXiv:2012.02476 (2020)."—also known as Wang et al). The system of the present disclosure modified RecSim to mimic long-tailed distribution over item clicks as follows: The system and method consider a) two user types UT1 and UT2, and 10 items such that UT1 and UT2 have higher interests in a different subset of items, and b) user types distribution while interaction with the simulation model as 0.8 and 0.2 for UT1 and UT2, respectively. This results in items that UT2 is interested in to be less frequent in the historical session logs generated via a random agent interacting with the simulator over 2 k sessions of length five each. The system and method evaluated all the approaches with UT1 and UT2 distribution as {0.5, 0.5} over 2 k sessions (1 k for each user type).

Evaluation Metrics Considered: CTR (Click Through Rate): Percentage of clicks across the test sessions. Average Recommendation Popularity (ARP): This measure calculates the average popularity of the recommended items in each list given by $$ARP = \frac{1}{|s|}\sum_{s \in S}\frac{\sum_{i \in L_s}\phi(i)}{|L_s|},$$

where $\phi(i)$ is popularity of item i, i.e., the number of times item i appears in the training set, $L_s$ is the recommended list of items for session s, and ISI is the number of sessions.

Diginetica (DN): The system and method of the present disclosure used a large-scale real-world recommendation dataset from CIKM Cup 20162 (e.g., refer "ShuWu, Yuyuan Tang, Yanqiao Zhu, LiangWang, Xing Xie, and Tieniu Tan. 2019. Session-based Recommendation with Graph Neural Networks. In Proceedings of the Thirty-Third AAAI Conference on Artificial Intelligence.") to evaluate the effectiveness of the method of the present disclosure for offline re-ranking. Following conventional research work (e.g., refer "Xueying Bai, Jian Guan, and Hongning Wang. 2019. A Model-Based Reinforcement Learning with Adversarial Training for Online Recommendation. In Advances in Neural Information Processing Systems. 10734-10745."—also known as Bai et al.), sessions of length 1 or longer than 20 and items that have never been clicked were filtered out by system and method of the present disclosure. Top 40 k popular items were selected into the recommendation candidate set, and selected 1,81, 648/4,780/4,781 sessions for training/validation/testing respectively based on chronological splits. The average length of sessions was found to be 4.19/3.96/3.72, respectively.

Evaluation Metrics Considered: The system and method used the standard offline evaluation metrics Recall@K and Mean Reciprocal Rank (MRR@K), along with popularity bias related metric ARP.

Hyperparameter Setup: The system and method of the present disclosure used offline validation data for hyperparameter selection using Recall@1 as performance metric for all approaches. The system and method of the present disclosure used SGD optimizer as known in the art with mini-batch size 100, momentum 0.9 and learning rate 0.001. For the method of the present disclosure, the system 100 used decay rate µ=0.9, and grid-search over α in {0, 1.0, 2.5, 5.0, 7.5, 10.0}, in {0, 0.001, 0.01, 0.05, 0.1, 0.5, 1.0}, and K in {1, 2, 4}. The best parameters on the validation set are K=1, α=5.0, β=0.5 and K=1, α=2.5, β=0.01 for RecSim and DN, respectively. Observations:

The system and method of the present disclosure made the following key observations from Tables 1, 2, and 3 and FIGS. 4A through 4G:

1. Method of the present disclosure performed better than all baselines considered in terms of CTR for online evaluation on RecSim, and Recall@10 and MRR@10 for offline evaluation on DN. More importantly, Method of the present disclosure outperforms other methods on less popular target items, i.e., UT2 in RecSim and long-tail items in DN.

2. In online evaluation on RecSim, most methods including the vanilla SR-GNN depict a high-variance in performance in terms of CTR on UT1 versus UT2, i.e., they do well only on one of the user types (e.g., CTR of 81.8 on UT1 versus 54.6 on UT2 for SR-GNN) with few exceptions in xQuAD, DTDE, MACR and method of the present disclosure, indicating the amplification of bias in most baselines. Method of the present disclosure is the only method which depicts CTR>75.0 on both user types, thus indicating robustness to popularity bias. Similarly, in offline evaluation on DN, the system and method of the present disclosure observed significant gap in performance of most baselines on head versus tail items in terms of Recall and MRR. Method of the present disclosure is significantly better on long-tail items while retaining comparable performance on mid and head items.

3. The robustness of method of the present disclosure to popularity bias has been further validated by significantly better or comparable performance in terms of popularity bias metric ARP when compared to most baselines, in addition to better performance on CTR or Recall and MRR. While Capsule and DLWS methods perform better than the method of present disclosure on ARP for both RecSim and DN, they are worse than method of the present disclosure in terms of overall CTR or Recall arguably the more important performance metrics which determines better customer experience.

Figure 4A:
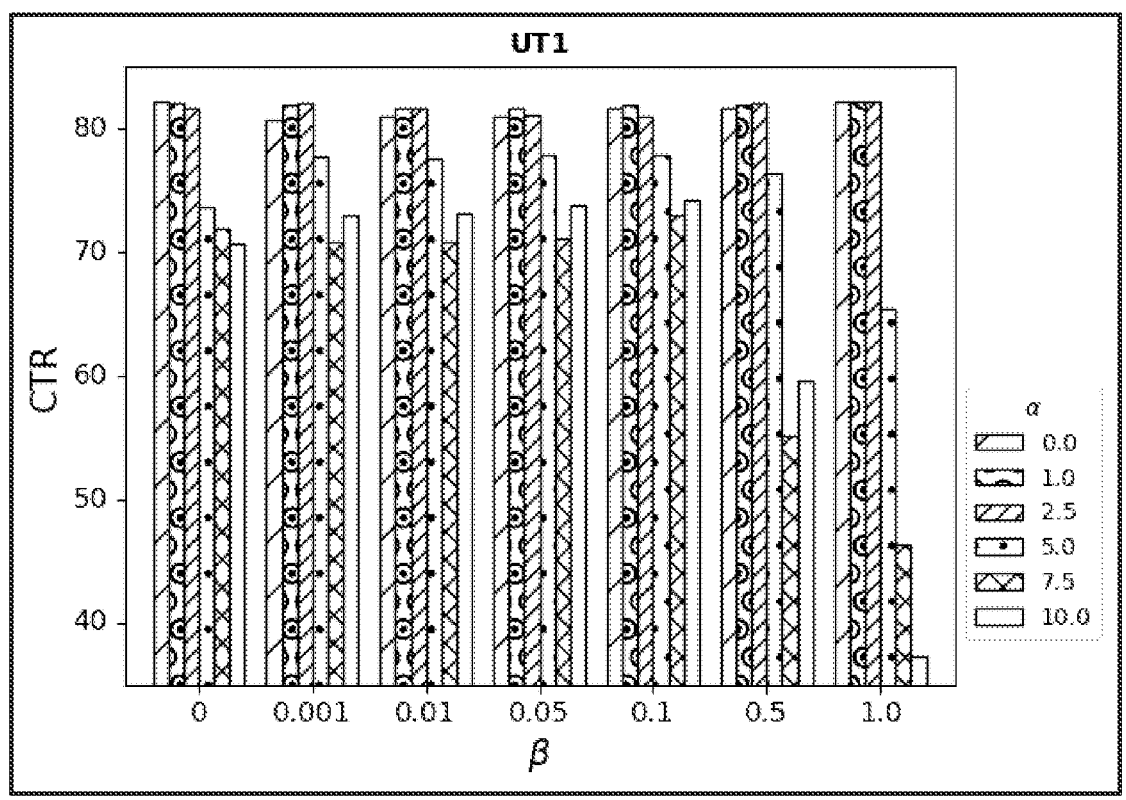
FIGS. 4A and 4B depict an importance of $\alpha$ to remove the indirect (bad) momentum effect, and $\beta$ to adjust conformity bias for user types UT1 and UT2 respectively for RecSim dataset, in accordance with an embodiment of the present disclosure.
Figure 4B:
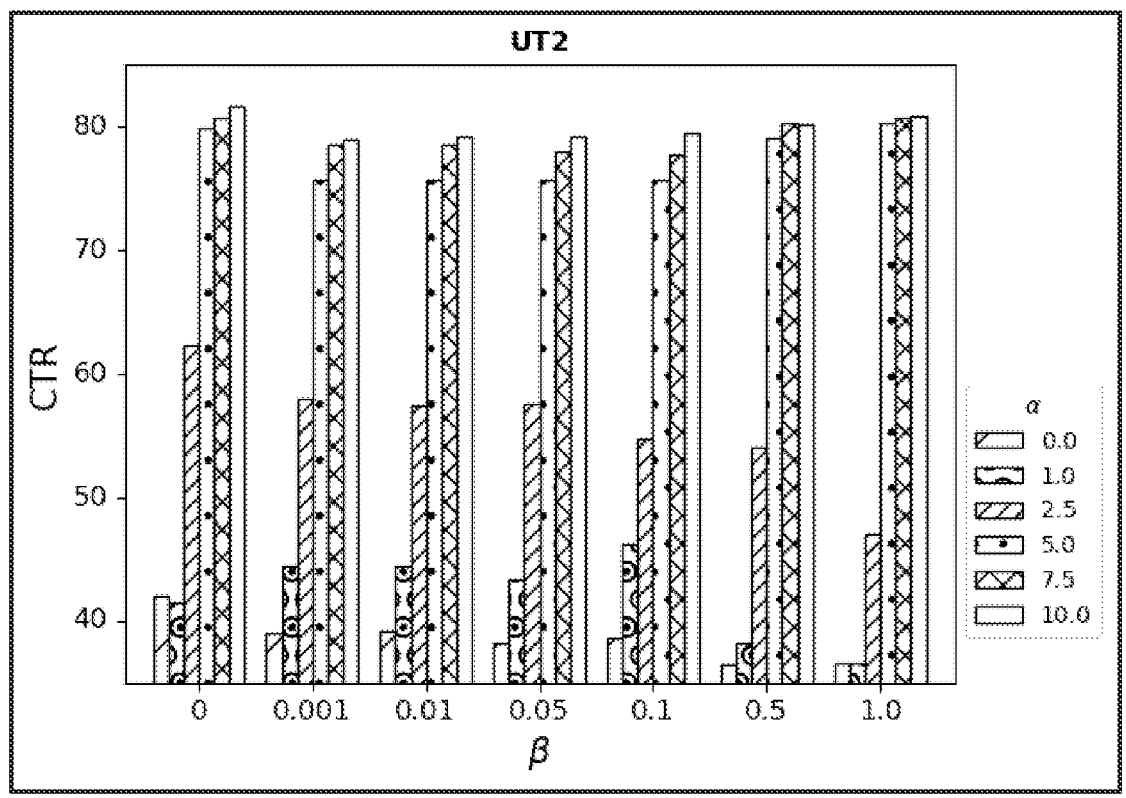
Figure 4C:
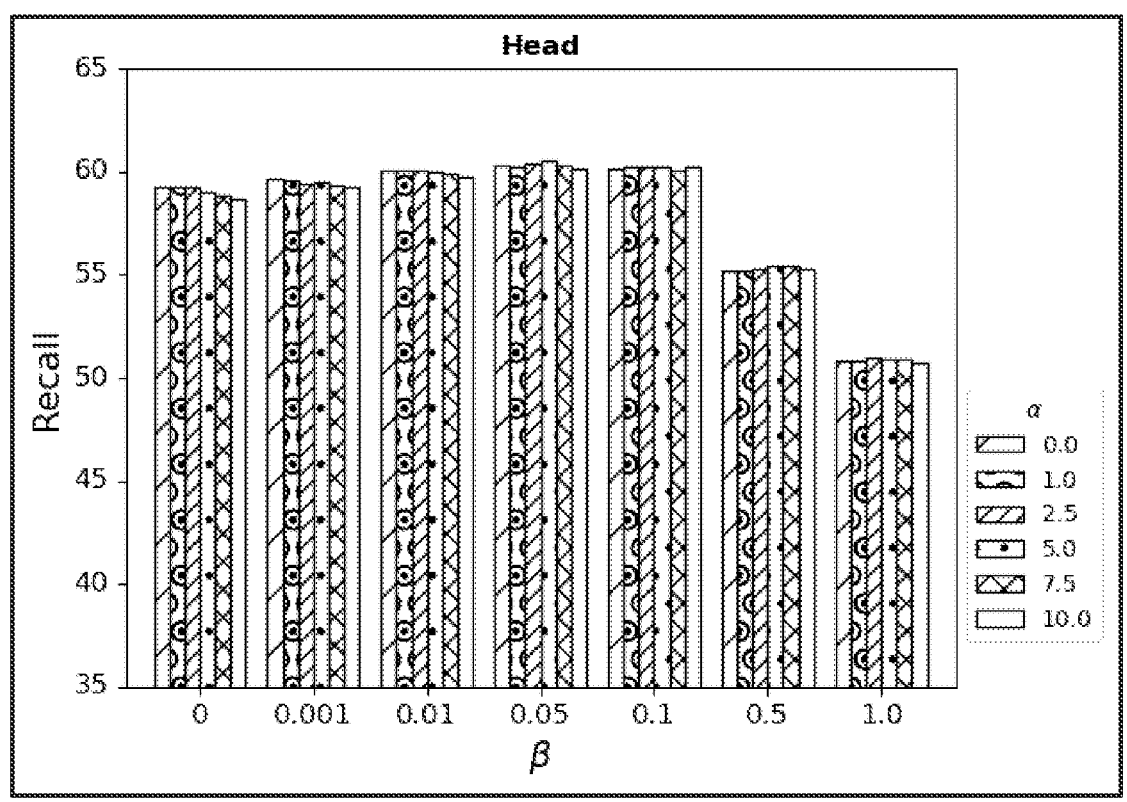
FIG. 4C depicts a first plot describing importance of $\alpha$ to remove the indirect (bad) momentum effect, and $\beta$ to adjust conformity bias for Head, Mid, and Long-tail for Diginetica (DN) dataset respectively, in accordance with an embodiment of the present disclosure.
Figure 4D:
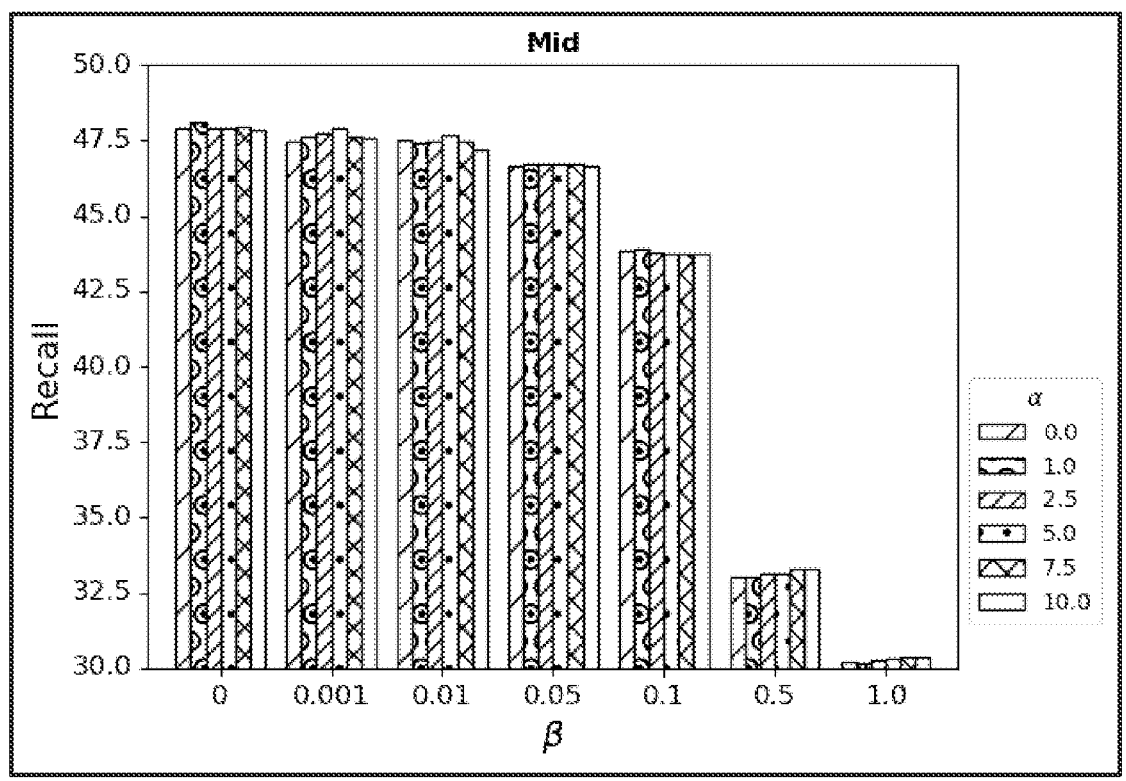
FIG. 4D depicts a second plot describing importance of a to remove the indirect (bad) momentum effect, and $\beta$ to adjust conformity bias for Head, Mid, and Long-tail for Diginetica (DN) dataset respectively, in accordance with an embodiment of the present disclosure.
Figure 4E:
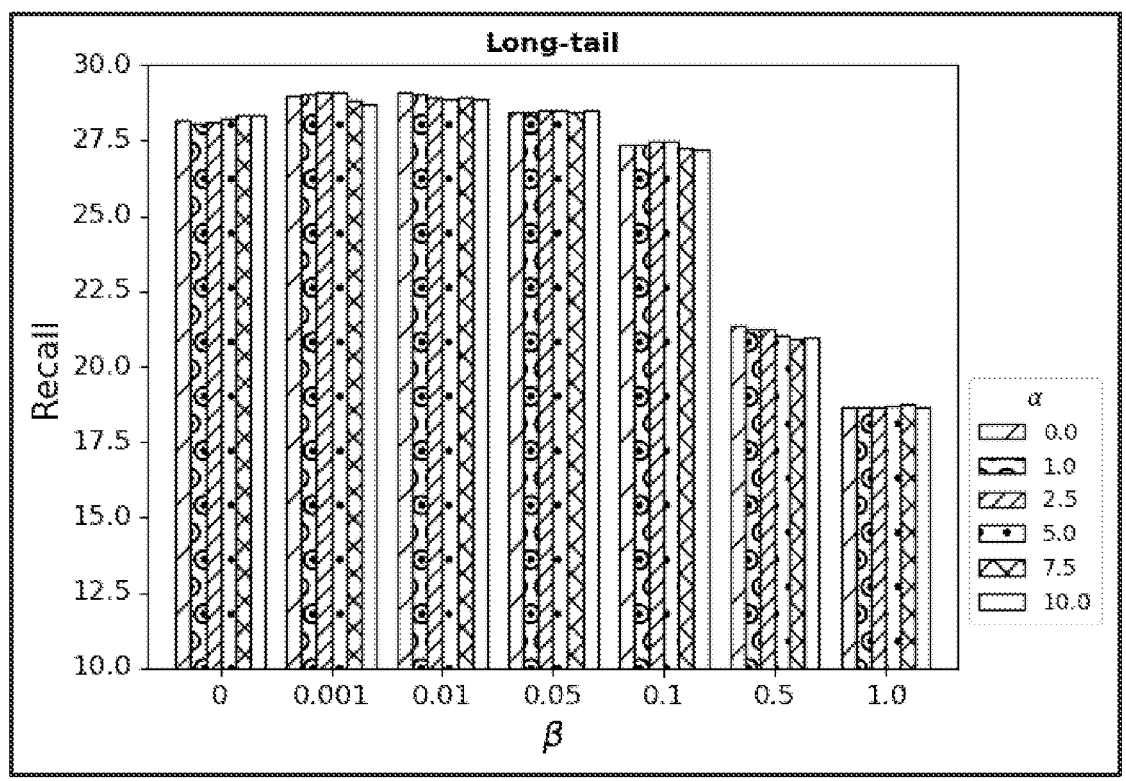
FIG. 4E depicts a third plot describing importance of $\alpha$ to remove the indirect (bad) momentum effect, and $\beta$ to adjust conformity bias for Head, Mid, and Long-tail for Diginetica (DN) dataset respectively, in accordance with an embodiment of the present disclosure.

4. System of the present disclosure also performed an ablation study on various features of the method described herein: a) removing $L_2$ norm of session and item embeddings (refer equation (2)), b) removing the direct effect of item embedding on outcome, i.e., β=0 (refer above steps described in FIG. 2). It was observed that both features are critical to the performance of the method of the present disclosure. The system of the present disclosure further studied the importance of α to remove the indirect (bad) momentum effect, and β to adjust conformity bias in FIG. 4A through FIG. 4B. More specifically, FIG. 4A through FIG. 4B, with reference to FIGS. 1 through 3B, depict an importance of α to remove the indirect (bad) momentum effect, and β to adjust conformity bias for user types UT1 and UT2 respectively for RecSim dataset, in accordance with an embodiment of the present disclosure. FIGS. 4C through 4E depict an importance of α to remove the indirect (bad) momentum effect, and β to adjust conformity bias for Head, Mid, and Long-tail for Diginetica (DN) dataset respectively, in accordance with an embodiment of the present disclosure. It is observed from FIGS. 4A through 4E that that increasing α leads to improved performance on UT2/less popular items and drop in performance on UT1/more popular items, indicating the usefulness of adjusting for the indirect bad momentum effect (S→D→Y). The sensitivity of results to β shows the importance of conformity bias adjustment.

Figure 4F:
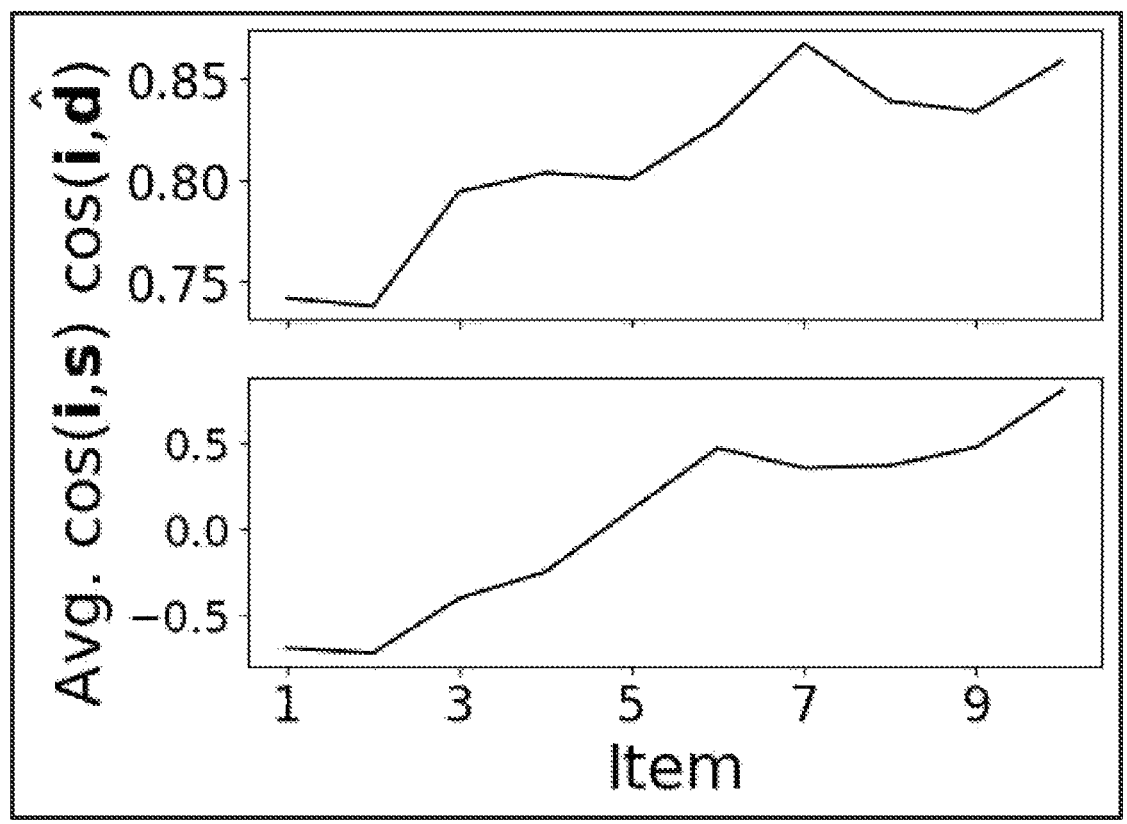
FIG. 4F depicts a graphical representation illustrating cosine similarity between item embedding i and normalized weighted moving-average session embedding $\hat{d}$, i.e., cos (i, $\hat{d}$), and average cosine similarity between all sessions embedding and item embedding i are biased towards head items for RecSim dataset, in accordance with an embodiment of the present disclosure.
Figure 4G:
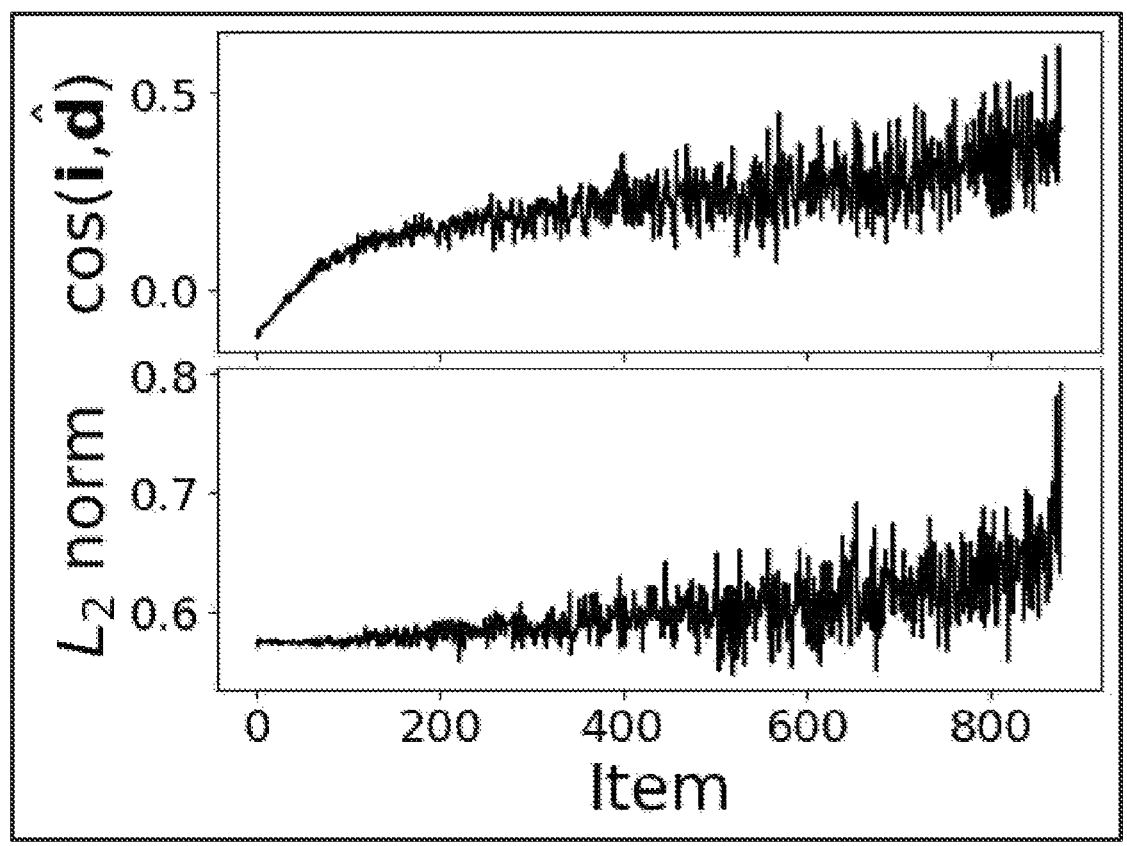
FIG. 4G depicts a graphical representation illustrating cosine similarity between item embedding i and normalized weighted moving-average session embedding $\hat{d}$, i.e., cos (i, $\hat{d}$), and $L_2$ norm of item embedding is biased towards head items for Diginetica (DN) dataset, in accordance with an embodiment of the present disclosure.

5. The system of the present disclosure also manifested the cause of bias and how the method of the present disclosure is able to handle effectively: a) Cosine similarity between item embedding i and normalized weighted moving-average session embedding $\hat{d}$, i.e., cos (i, $\hat{d}$), depicts that $\hat{d}$ is biased towards head items as shown in FIGS. 4F and 4G for RecSim and Diginetica (DN), respectively. Method of the present disclosure is able to handle by adjusting for S→D→Y using equation (3). b) Average cosine similarity between all sessions embedding and item embedding i, i.e., Avg. cos(i,s) for RecSim as shown in FIG. 4F, and $L_2$ norm of item embedding for DN as shown in FIG. 4G are biased towards head items. Method of the present disclosure is able to handle this by $L_2$ norm in equation (2). More specifically, FIG. 4F, with reference to FIGS. 1 through 4E, depicts a graphical representation illustrating cosine similarity between item embedding i and normalized weighted moving-average session embedding $\hat{d}$, i.e., cos (i, $\hat{d}$), and average cosine similarity between all sessions embedding and item embedding i are biased towards head items for RecSim dataset, in accordance with an embodiment of the present disclosure. FIG. 4G, with reference to FIGS. 1 through 4F, depicts a graphical representation illustrating cosine similarity between item embedding i and normalized weighted moving-average session embedding $\hat{d}$, i.e., cos (i, $\hat{d}$), and $L_2$ norm of item embedding is biased towards head items for Diginetica (DN) dataset, in accordance with an embodiment of the present disclosure.

TABLE 1

RecSim (Online Evaluation)

| | | RecSim (Online evaluation) | | | | | |
|---|---|---|---|---|---|---|---|
| | | UT1 | | UT1 | | Overall | |
| Type | Methods | CTR | ARP | CTR | ARP | CTR | ARP |
| Backbone | SRGNN (prior art) | 81.78 | 0.79 | 54.58 | 0.81 | 68.18 | 0.8 |
| Re-ranking | xQUAD (prior art) | 75.43 | 0.83 | 73.17 | 0.77 | 74.27 | 0.8 |
| | PC (prior art) | 74.54 | 0.83 | 74.02 | 0.77 | 74.28 | 0.8 |
| Long-tailed Classification | Capsule (prior art) | 38.86 | 0.53 | 80.42 | 0.58 | 59.64 | 0.56 |
| | DLWS (prior art) | 81.78 | 0.79 | 54.58 | 0.82 | 68.18 | 0.8 |
| | Focal loss (prior art) | 82.12 | 0.79 | 56.44 | 0.81 | 69.28 | 0.8 |
| | DTDE (prior art) | 73.64 | 0.59 | 77.6 | 0.68 | 75.62 | 0.63 |
| Popularity bias | NISER (prior art) | 74.54 | 0.65 | 48.68 | 0.72 | 61.61 | 0.68 |
| | TailNet (prior art) | 78.1 | 0.66 | 73.34 | 0.73 | 75.72 | 0.7 |
| | PDA (prior art) | 81.9 | 0.79 | 57.52 | 0.81 | 69.71 | 0.8 |
| | MACR (prior art) | 80.44 | 0.69 | 72.14 | 0.75 | 76.29 | 0.72 |

TABLE 1-continued

RecSim (Online Evaluation)

| | | RecSim (Online evaluation) | | | | | |
|---|---|---|---|---|---|---|---|
| | | UT1 | | UT1 | | Overall | |
| Type | Methods | CTR | ARP | CTR | ARP | CTR | ARP |
| System of the present disclosure and Ablations | Method of the present disclosure | 76.32 | 0.65 | 79.08 | 0.64 | 77.7 | 0.65 |
| | $-\mathcal{L}_I$ | 73.66 | 0.61 | 79.84 | 0.67 | 76.75 | 0.64 |
| | −Norm | 81.74 | 0.77 | 55.32 | 0.81 | 68.53 | 0.79 |

TABLE 2

Diginetica (DN) - (Offline Evaluation)

| | | Diginetica (Offline Evaluation) | | | | | |
|---|---|---|---|---|---|---|---|
| | | Long tail | | | Mid | | |
| Type | Methods | R | MRR | ARP | R | MRR | ARP |
| Backbone | SRGNN (prior art) | 24.84 | 12.27 | 0.06 | 42.63 | 17.58 | 0.09 |
| Re-ranking | xQUAD (prior art) | 26.41 | 12.65 | 0.06 | 42.97 | 17.59 | 0.08 |
| | PC (prior art) | 25.75 | 12.33 | 0.06 | 44.03 | 18 | 0.08 |
| Long-tailed Classification | Capsule (prior art) | 25.43 | 12.19 | 0.13 | 32.23 | 12.69 | 0.16 |
| | DLWS (prior art) | 28.83 | 13.41 | 0.04 | 46.07 | 18.81 | 0.05 |
| | Focal loss (prior art) | 25.23 | 11.77 | 0.07 | 42.95 | 17.36 | 0.1 |
| | DTDE (prior art) | 27.53 | 12.85 | 0.06 | 47.42 | 18.54 | 0.09 |
| Popularity bias | NISER (prior art) | 26.76 | 12.55 | 0.06 | 45.45 | 17.94 | 0.09 |
| | TailNet (prior art) | 22 | 9.92 | 0.07 | 42.86 | 18.07 | 0.1 |
| | PDA (prior art) | 26.07 | 12.47 | 0.06 | 44.76 | 17.97 | 0.09 |
| | MACR (prior art) | 24.22 | 11.13 | 0.05 | 37.02 | 14.84 | 0.08 |
| System of the present disclosure and Ablations | Method of the present disclosure | 29.09 | 13.25 | 0.06 | 47.74 | 18.59 | 0.08 |
| | $-\mathcal{L}_I$ | 28.13 | 13.04 | 0.06 | 47.88 | 18.7 | 0.08 |
| | −Norm | 27.14 | 12.72 | 0.06 | 44.05 | 17.81 | 0.08 |

TABLE 3

Diginetica (DN) - (Offline Evaluation)

| | | Diginetica (Offline Evaluation) | | | | | |
|---|---|---|---|---|---|---|---|
| | | Head | | | Overall | | |
| Type | Methods | R | MRR | ARP | R | MRR | ARP |
| Backbone | SRGNN (prior art) | 58.51 | 24.12 | 0.16 | 41.98 | 18 | 0.1 |
| Re-ranking | xQUAD (prior art) | 56.79 | 23.61 | 0.15 | 42.05 | 17.95 | 0.1 |
| | PC (prior art) | 57.43 | 23.78 | 0.15 | 42.4 | 18.03 | 0.1 |
| Long-tailed Classification | Capsule (prior art) | 55.56 | 23.57 | 0.24 | 37.73 | 16.15 | 0.18 |
| | DLWS (prior art) | 49.4 | 20.29 | 0.11 | 41.43 | 17.5 | 0.07 |
| | Focal loss (prior art) | 59.86 | 25.65 | 0.17 | 42.67 | 18.26 | 0.11 |
| | DTDE (prior art) | 59.61 | 25.14 | 0.16 | 44.84 | 18.84 | 0.1 |
| Popularity bias | NISER (prior art) | 57.78 | 24.45 | 0.16 | 43.32 | 18.31 | 0.1 |
| | TailNet (prior art) | 58.19 | 24.13 | 0.17 | 41.31 | 17.37 | 0.11 |
| | PDA (prior art) | 58.69 | 24.15 | 0.16 | 43.17 | 18.19 | 0.1 |
| | MACR (prior art) | 45.01 | 18.75 | 0.15 | 35.41 | 14.91 | 0.09 |
| System of the present disclosure and Ablations | Method of the present disclosure | 59.41 | 25.17 | 0.16 | 45.4 | 19 | 0.1 |
| | $-\mathcal{L}_I$ | 59.24 | 25.33 | 0.16 | 45.08 | 19.02 | 0.1 |
| | −Norm | 59.08 | 23.91 | 0.16 | 43.42 | 18.14 | 0.1 |

As can be observed from the experimental evaluation and observations, most recent approaches to recommendation systems for items recommendation have focused on popularity bias from a user-item perspective. On the other hand, embodiments of the present disclosure, the system 100 and method of FIG. 2 described herein consider an orthogonal perspective on the bias introduced because of long-tailed item distribution to the training dynamics based on commonly used momentum-based optimizer for multi-class classification. As a result, the system and method of the present disclosure provide a more holistic view on popularity bias as well as ways to mitigate it. Though the method and system of the present disclosure has been described and evaluated in context of session-based recommendation of items and tested using SR-GNN as backbone architecture, the method and system 100 would be applicable to any deep-learning-based recommender system. It is to be understood by a person having ordinary skill in the art or person skilled in the art that though examples are described with reference to specific items herein, such examples shall not be construed as limiting the scope of the present disclosure. For instance, items may also be corresponding to one or more products and/or services as applicable (e.g., depending upon domain(s) (e.g., medical, automobile, and the like), industry (e.g., healthcare, automobile parts, and the like), application(s)—which use case scenario it is used and implemented/deployed, and the like).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, via one or more hardware processors, a training session browsing history of a user from a user device, wherein the session browsing history comprises information on one or more items, and a session comprising a sequence of clicks on the one or more items; performing, via the one or more hardware processors, deconfounding training of a neural network (NN) model using (i) a plurality of causal graphs obtained based on domain knowledge, (ii) the training session browsing history, and (iii) a catalogue of items to obtain a trained NN model, wherein the step of performing deconfounding training of the neural network (NN) model comprises:
creating an embedding look up matrix for the one or more items in the catalogue of items;
normalizing the embedding look up matrix to obtain one or more normalized item embeddings;
modelling one or more session embeddings based on the sequence of clicks on the one or more items to obtain one or more modelled session embeddings;
dividing the one or more normalized item embeddings and the one or more modelled session embeddings into one or more corresponding groups;
normalizing each group from the one or more corresponding groups to obtain one or more normalized item embeddings groups and one or more normalized session embeddings groups;
performing a comparison of (i) each normalized item embeddings group, and (ii) each normalized session embedding group to determine a similarity therein;
obtaining a logit for each item from the one or more items based on the determined similarity;
applying a softmax function on the logit obtained for each item from the one or more items to obtain a relevance score for each item from the one or more items;
computing one or more cross entropy losses corresponding to one or more values of one or more weights of the neural network model based on the obtained relevance score for each item from the one or more items; and
training, via an optimizer, the neural network model using the one or more cross entropy losses and updating the one or more weights of the trained neural network model;
applying, via the one or more hardware processors, the trained NN model to a test session browsing history comprising information corresponding to a sequence of items, to obtain a causal inference derived from a test output associated therein;
identifying, via the one or more hardware processors, a total effect associated with one or more items on the test session browsing history based on the causal inference;
removing, via the one or more hardware processors, an indirect effect from the total effect;
upon removing the indirect effect, obtaining, via the one or more hardware processors, a logit for each item comprised in the catalogue of items (212);
applying, via the one or more hardware processors, a softmax function on the logit obtained for each item from the catalogue of items to obtain a relevance score for each item from the catalogue of items (214); and recommending, via the one or more hardware processors, at least a subset of items from the catalogue of items based on the relevance score (216).

2. The processor implemented method of claim 1, wherein a first causal graph of the plurality of causal graphs comprises at least one of (i) one or more nodes representing interest of the user during the session, (ii) one or more features of the one or more items along with an associated popularity, (iii) a relevance score of the one or more items during the session based on the interest of the user, and (iv) an outcome associated with a corresponding item.

3. The processor implemented method of claim 1, wherein a second causal graph of the plurality of causal graphs comprises at least one of (i) one or more embeddings corresponding to the one or more items, (ii) embedding of a session, (iii) a momentum of an optimizer, (iv) average embedding of two or more sessions comprised in the session browsing history biased towards embeddings of popular items, and (v) a probability of clicking an item.

4. The processor implemented method of claim 3, wherein the neural network model is deconfounding trained to (i) reduce an effect of the momentum of the optimizer comprised in the second causal graph, and (ii) control an amount of bias due to the one or more features of the one or more items on the outcome associated thereof.

5. A system, comprising:
a memory storing instructions;
one or more communication interfaces; and
one or more hardware processors coupled to the memory via the one or more communication interfaces, wherein the one or more hardware processors are configured by the instructions to:
receive a training session browsing history of a user from a user device, wherein the session browsing history comprises information on one or more items, and a session comprising a sequence of clicks on the one or more items;
perform deconfounding training of a neural network (NN) model using (i) a plurality of causal graphs obtained based on domain knowledge, (ii) the training session browsing history, and (iii) a catalogue of items to obtain a trained NN model, wherein the neural network (NN) model is deconfounding trained by:
creating an embedding look up matrix for the one or more items in the catalogue of items;
normalizing the embedding look up matrix to obtain one or more normalized item embeddings;
modelling one or more session embeddings based on the sequence of clicks on the one or more items to obtain one or more modelled session embeddings;
dividing the one or more normalized item embeddings and the one or more modelled session embeddings into one or more corresponding groups;
normalizing each group from the one or more corresponding groups to obtain one or more normalized item embeddings groups and one or more normalized session embeddings groups;
performing a comparison of (i) each normalized item embeddings group, and (ii) each normalized session embedding group to determine a similarity therein;
obtaining a logit for each item from the one or more items based on the determined similarity;
applying a softmax function on the logit obtained for each item from the one or more items to obtain a relevance score for each item from the one or more items;
computing one or more cross entropy losses corresponding to one or more values of one or more weights of the neural network model based on the obtained relevance score for each item from the one or more items; and
training, via an optimizer, the neural network model using the one or more cross entropy losses and updating the one or more weights of the trained neural network model;
apply the trained NN model to a test session browsing history comprising information corresponding to a sequence of items, to obtain a causal inference derived from a test output associated therein;
identify a total effect associated with one or more items on the test session browsing history based on the causal inference;
remove an indirect effect from the total effect;
upon removing the indirect effect, obtain a logit for each item comprised in the catalogue of items;
apply a softmax function on the logit obtained for each item from the catalogue of items to obtain a relevance score for each item from the catalogue of items; and
recommend at least a subset of items from the catalogue of items based on the relevance score.

6. The system of claim 5, wherein a first causal graph of the plurality of causal graphs comprises at least one of (i) one or more nodes representing interest of the user during the session, (ii) one or more features of the one or more items along with an associated popularity, (iii) a relevance score of the one or more items during the session based on the interest of the user, and (iv) an outcome associated with a corresponding item.

7. The system of claim 5, wherein a second causal graph of the plurality of causal graphs comprises at least one of (i) one or more embeddings corresponding to the one or more items, (ii) embedding of a session, (iii) a momentum of an optimizer, (iv) average embedding of two or more sessions comprised in the session browsing history biased towards embeddings of popular items, and (v) a probability of clicking an item.

8. The system of claim 7, wherein the neural network model is deconfounding trained to (i) reduce an effect of the momentum of the optimizer comprised in the second causal graph, and (ii) control an amount of bias due to the one or more features of the one or more items on the outcome associated thereof.

9. One or more non-transitory machine-readable information storage mediums comprising one or more instructions which when executed by one or more hardware processors cause:
receiving, a training session browsing history of a user from a user device, wherein the session browsing history comprises information on one or more items, and a session comprising a sequence of clicks on the one or more items;
performing deconfounding training of a neural network (NN) model using (i) a plurality of causal graphs obtained based on domain knowledge, (ii) the training session browsing history, and (iii) a catalogue of items to obtain a trained NN model, wherein the step of performing deconfounding training of the neural network (NN) model comprises:
creating an embedding look up matrix for the one or more items in the catalogue of items;
normalizing the embedding look up matrix to obtain one or more normalized item embeddings;
modelling one or more session embeddings based on the sequence of clicks on the one or more items to obtain one or more modelled session embeddings;

dividing the one or more normalized item embeddings and the one or more modelled session embeddings into one or more corresponding groups;
normalizing each group from the one or more corresponding groups to obtain one or more normalized item embeddings groups and one or more normalized session embeddings groups;
performing a comparison of (i) each normalized item embeddings group, and (ii) each normalized session embedding group to determine a similarity therein;
obtaining a logit for each item from the one or more items based on the determined similarity;
applying a softmax function on the logit obtained for each item from the one or more items to obtain a relevance score for each item from the one or more items;
computing one or more cross entropy losses corresponding to one or more values of one or more weights of the neural network model based on the obtained relevance score for each item from the one or more items; and
training, via an optimizer, the neural network model using the one or more cross entropy losses and updating the one or more weights of the trained neural network model;
applying the trained NN model to a test session browsing history comprising information corresponding to a sequence of items, to obtain a causal inference derived from a test output associated therein;
identifying a total effect associated with one or more items on the test session browsing history based on the causal inference;
removing an indirect effect from the total effect;
upon removing the indirect effect, obtaining a logit for each item comprised in the catalogue of items;
applying a softmax function on the logit obtained for each item from the catalogue of items to obtain a relevance score for each item from the catalogue of items; and
recommending at least a subset of items from the catalogue of items based on the relevance score.

10. The one or more non-transitory machine-readable information storage mediums of claim 9, wherein a first causal graph of the plurality of causal graphs comprises at least one of (i) one or more nodes representing interest of the user during the session, (ii) one or more features of the one or more items along with an associated popularity, (iii) a relevance score of the one or more items during the session based on the interest of the user, and (iv) an outcome associated with a corresponding item.

11. The one or more non-transitory machine-readable information storage mediums of claim 9, wherein a second causal graph of the plurality of causal graphs comprises at least one of (i) one or more embeddings corresponding to the one or more items, (ii) embedding of a session, (iii) a momentum of an optimizer, (iv) average embedding of two or more sessions comprised in the session browsing history biased towards embeddings of popular items, and (v) a probability of clicking an item.

12. The one or more non-transitory machine-readable information storage mediums of claim 11, wherein the neural network model is deconfounding trained to (i) reduce an effect of the momentum of the optimizer comprised in the second causal graph, and (ii) control an amount of bias due to the one or more features of the one or more items on the outcome associated thereof.

* * * * *